May 26, 1942.  S. V. DILLON  2,283,975
PIPE COUPLING
Filed Dec. 6, 1940  3 Sheets-Sheet 1
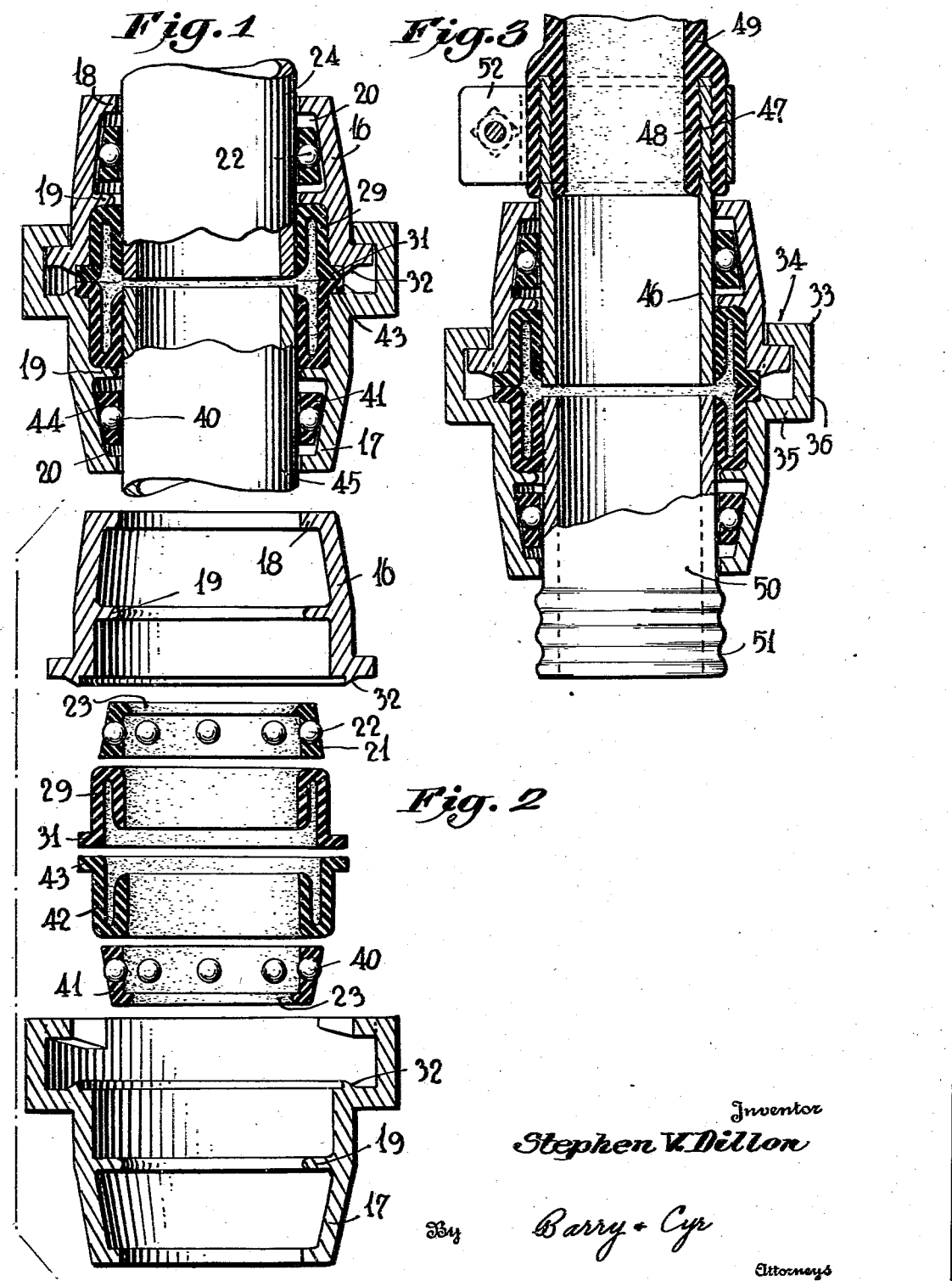
Inventor
Stephen V. Dillon
By Barry + Cyr
Attorneys

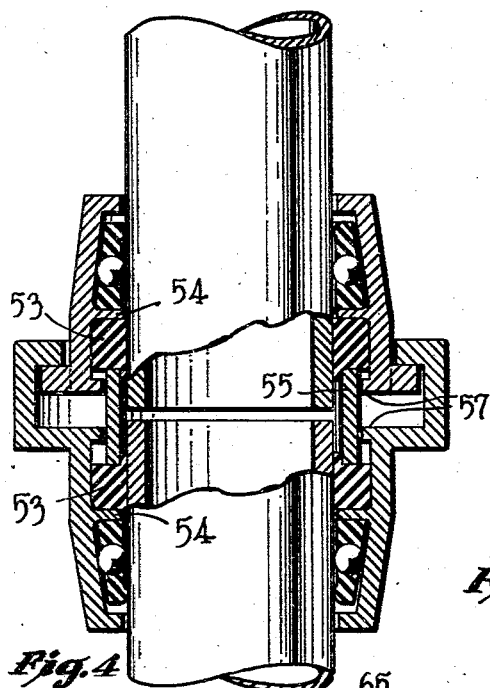
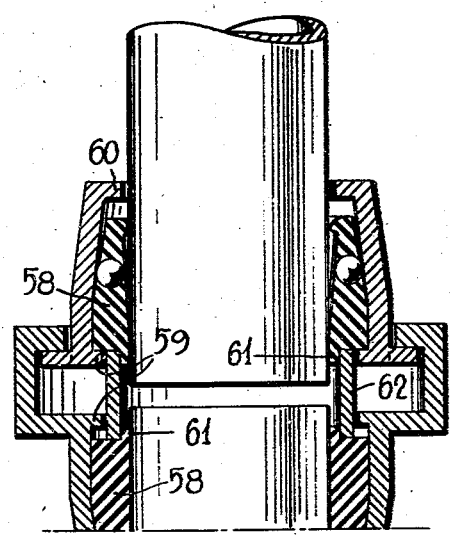
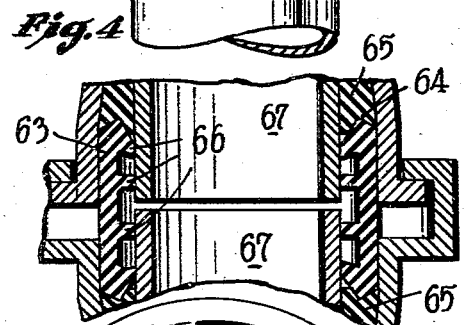
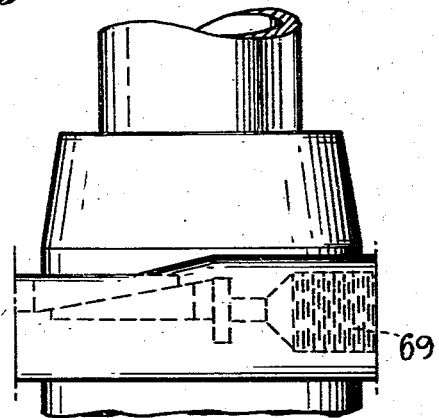
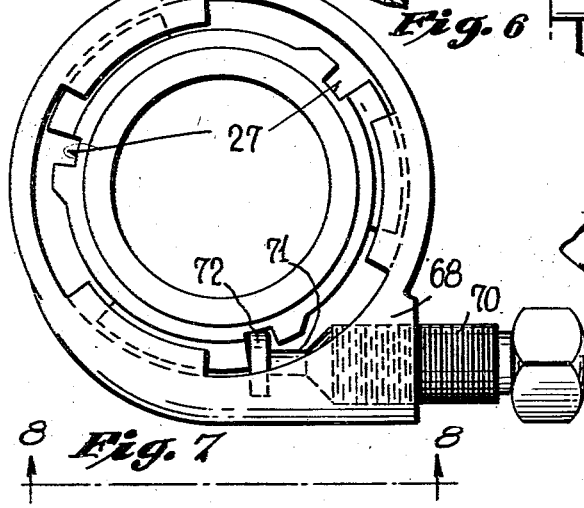
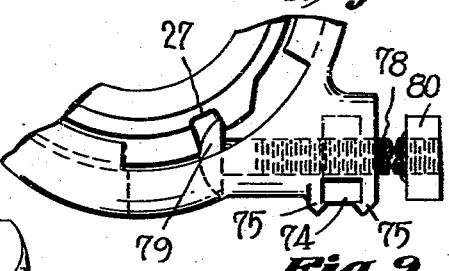

May 26, 1942.  S. V. DILLON  2,283,975
PIPE COUPLING
Filed Dec. 6, 1940   3 Sheets-Sheet 3
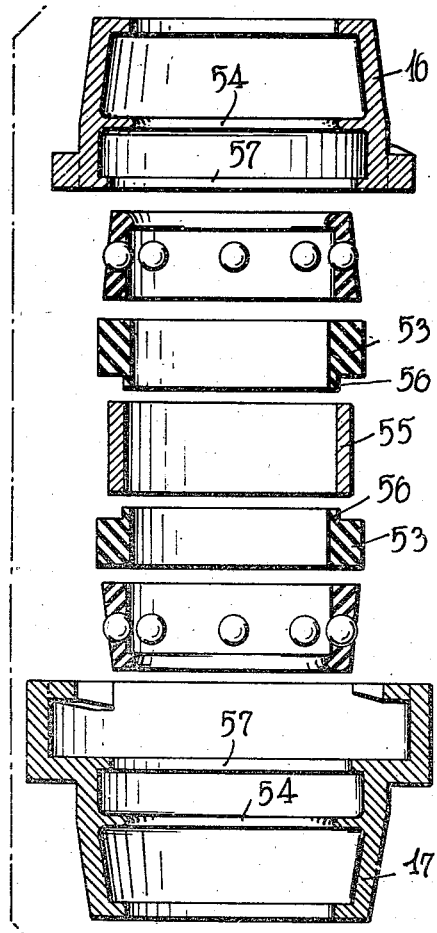
Fig. 10
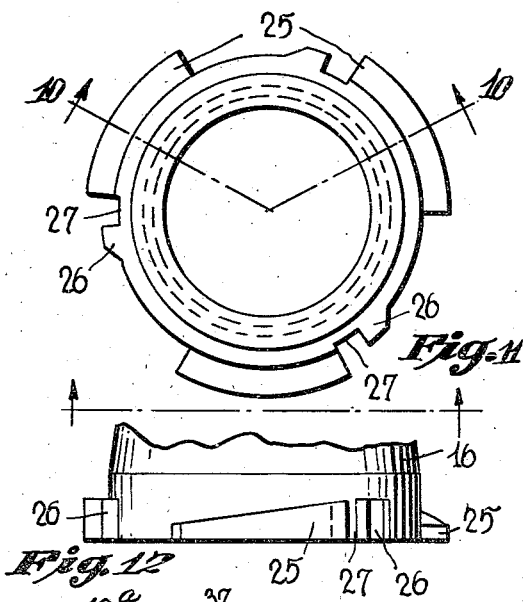
Fig. 11
Fig. 12
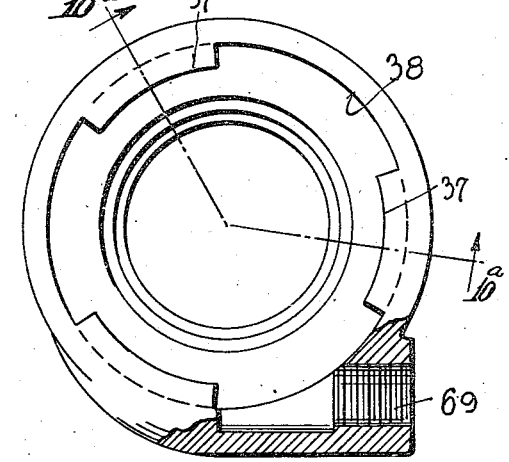
Fig. 13
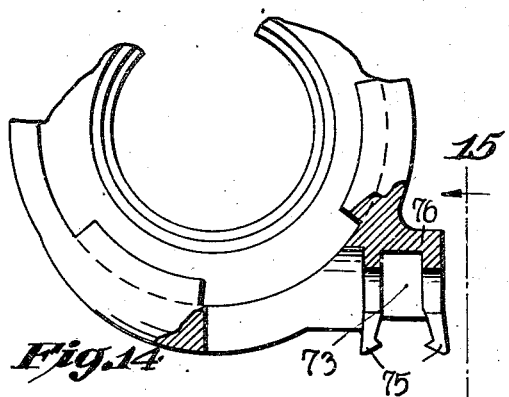
Fig. 14
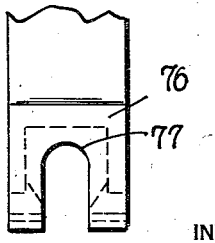
Fig. 15
INVENTOR
Stephen V. Dillon
BY Barry + Cyr
ATTORNEYS Patented May 26, 1942

2,283,975

UNITED STATES PATENT OFFICE 2,283,975

PIPE COUPLING

Stephen V. Dillon, Tulsa, Okla.

Application December 6, 1940, Serial No. 368,943

3 Claims. (Cl. 285—175)

This invention relates to improvements in pipe couplings and more particularly to couplings of the general character disclosed in my Patent 2,182,797, and application Serial No. 233,865, dated October 7, 1938.

In my patent and application I have disclosed novel couplings of the quick-detachable type provided with simple practical means to grip or release pipes inserted in the coupling housing. The couplings there are of such character that they may be used in joining pipes and after the coupling elements are assembled at the factory, the coupling may be speedily applied to the pipes without the use of tools, bolts or the like. Furthermore, such couplings permit expansion, contraction or deflection of the pipes relatively to one another without liability of breaking the seal.

The primary purpose of the present invention is to provide improved means in such a coupling to facilitate sealing or dismantling.

Another object is to furnish a coupling of the bayonet type incorporating features of my prior inventions and eliminating one of the parts heretofore essential in a bayonet type coupling when used with threaded end pipes.

Other objects of the invention will appear in connection with the following detailed description when taken in connection with the accompanying drawings, in which:

Fig. 1 is a longitudinal sectional view of one form of the coupling shown applied to adjacent ends of plain end pipes.

Fig. 2 is a developed sectional view of the parts of the coupling illustrated in Fig. 1.

Fig. 3 is a view similar to Fig 1 but showing the coupling applied to two different types of hose nipples.

Fig. 4 is a longitudinal sectional view of another modification of the coupler with the cups or collars of the coupler connected to the pipes and in sealed condition.

Fig. 5 is a similar view of a further modification.

Fig. 6 is a fragmentary longitudinal section showing a different type of sealing means.

Fig. 7 is an end elevation of any one of the couplers shown in Figs. 1 to 6 inclusive.

Fig. 8 is a side elevation of the structure shown in Fig. 7 and taken on the line 8—8 of Fig. 7.

Fig 9 is a fragmentary end elevation illustrating a modification of the operating means.

Fig. 10 is a developed longitudinal sectional view of the parts of the coupling illustrated in Figs. 4 and 5, with the section of the upper cup taken on the line 10—10 of Fig. 11, and the lower section of the cup taken on the line 10a—10a of Fig. 13.

Fig. 11 is a plan view of the upper cup or collar of the coupling shown in Figs. 4 and 5.

Fig. 12 is a side elevation of the lower end portion of the same, and looking toward line 12—12 of Fig. 11.

Fig. 13 is a plan view partly in horizontal section of the lower cup or collar of the coupler illustrated in Figs. 4 and 5.

Fig. 14 is a fragmentary view similar to Fig. 13 illustrating the lower collar or cup before the nut of the operating means is attached thereto.

Fig. 15 is an elevation of a detail of the structure shown in Fig. 14.

In the embodiment illustrated in Figs. 1 and 2, the housing of the coupling consists of an upper collar or cup 16 and a lower collar or cup 17. The upper cup is provided with internal flanges 18 and 19 forming the ends of a groove 20 in which a cage 21 carrying rolling elements or balls 22, is arranged. The cage is adapted to move axially of the coupling within the groove 20 and it may be made in accordance with my abovementioned prior inventions. For instance, as shown in Fig. 2, it may consist of a ring of rubber or the like provided with any suitable means such as internal protuberances 23 to frictional engage a plain end pipe 24 inserted in the coupling.

The cup 16 is also provided, as best shown in Figs. 11 and 12, with outwardly extending spaced wings 25 and outwardly extending lugs 26, each lug being spaced from the adjacent end of a wing to provide a recess 27. Each wing has an inclined upper surface 28 for wedging purposes as will be hereinafter explained.

A packing ring or gasket 29 which is U-shaped in radial section may be arranged in a recess 30 in the lower end portion of the cup to receive pressure within the pipe line which will function to maintain the seal. The packing has an external lip 31 engaging the lower end of the cup, as well as a flange 32 which projects downwardly from the cup.

The lower cup 17, is similar to the upper cup but forms at its upper end portion a housing 33 having a top 34, bottom 35 and an annular wall 36. As best shown in Figs. 7 and 13, the top of the housing forms spaced inwardly extending lugs 37 spaced by recesses 38 which allow the wings 25 and lugs 26 of the cup 16 to be passed into the housing. Each lug of the housing (Fig.

10) has an inclined bottom surface 39 and these inclined surfaces are adapted to engage the inclined surfaces 29 of the upper cup to cause the cups to move toward one another when one is turned relatively to the other. The lower cup cooperates with balls 40, cage 41 and packing gasket 42 similar to like parts used with the upper cup, and when the cups are moved toward one another, it will be noted that the lip 31 of the upper gasket will be tightly pressed against the lip 43 of the lower gasket to effectively seal the joint.

It will be noted that the chamber 20 of each cup has an annular tapered seat or wall 44 extending lengthwise of the coupling for wedging the balls against the pipes 24, 45 when the pipes move away from one another. During such movement the protuberances 23 frictionally engage the pipes to cause the cages 21 and 41 to move with the pipes.

With a structure of this type, it is obvious that if plain end pipes are inserted into the coupling they will be gripped by the balls 22 and 40 so that it is unnecessary to specially shape the pipe ends with this particular coupling. At the same time the pipes can expand or contract and assume angular deflections relatively to one another without breaking the seal formed by the packing gaskets.

Instead of using the coupling with plain end pipes, it may, as shown in Fig. 3, be used in connection with hose nipples. For example, it may be employed with a nipple 46 having a neck 47 permanently secured to inner and outer layers 48 of a section 49 of hose. As shown in the lower portion of Fig. 3, the hose nipple 50 may be of the type having external corrugations 51 to facilitate the attachment of a section of hose by means of a conventional clamp 52 shown at the upper portion of Fig. 3.

The sealing means of the coupling may be of various constructions. For example, as shown in Fig. 4, an elastic packing ring 53 may be arranged in each cup and bear at one end against an internal flange 54 of the cup, and such rings may be compressed by an inelastic sleeve 55 having its ends tightly engaging the packing rings. As shown in Fig. 10, one end of each packing ring may be of step shape to provide an annular extension 56 to extend into the clamping ring 55, and each cup may have an internal flange 57 for confining the ring 55.

Where the ball cages are of rubber-like elastic material, they may be used for sealing purposes. Such a structure is shown in Fig. 5. There it will be noted that each ball cage 58 is elongated to substantially fill the space between the inner end outer internal flanges 59 and 60 of each cup, and the inner end of each cage is provided with an annular extension 61 to fit in the inelastic clamping or guide ring 62 interposed between the cages.

In Figs. 4 and 5, it will be obvious that when the upper cup is turned to cause the wedging action provided by the cam surfaces, the inelastic ring 55, 62 will cause distortion of the sealing means.

In the embodiment illustrated in Fig. 6, I employ an elastic packing sleeve 63 having the ends of its wall tapered or of ridge shape so as to fit in groove 64 in the inner ends of the ball cages 65. In this example, the packing sleeve is provided with a number of spaced internal lips 66 to engage the outer surfaces of the pipes 67.

In all forms of the invention, I propose to use operating means for turning one of the cups of the housing relatively to the other. For example, as shown in Figs. 7, 8 and 13, the channel shaped portion at the upper extremity of the lower cup is provided with a hollow arm 68 extending substantially tangentially from the channel with the cup, to the exterior of the latter. The bore of the arm is provided with internal threads 69 to cooperate with the external threads of an operating member or screw 70. The latter terminates at its inner end in a narrow neck 71 merging in a circular disc or head 72 designed to fit in any one of the recesses 27 of the upper cup. It will be obvious if the head 72 is extending into any one of the recesses, the upper collar may be turned relatively to the lower collar in opposite directions depending on the direction in which the screw 70 is turned. In Fig. 7, if the screw 70 is turned in a clockwise direction, the upper cup will be turned in a clockwise direction relatively to the lower cup and vice versa.

To reduce the expense involved in forming threads 69 within the hollow arm 68, I may use a conventional bolt as an operating means. For example, as shown in Fig. 14, the lower cup may be made with a cavity 73 to receive a conventional nut 74 (Fig. 9), and the nut may be clamped or secured in position by bendable fingers 75 at one end of the cavity. These fingers are integral with the cup and are of hook shape so that they may be bent from the position shown in Fig. 14 to that of Fig. 9, to fixedly secure the nut in position. In this embodiment of the invention, the arm 76 is of channel shape or provided with a groove 77 (Fig. 15) to receive the shank of a threaded bolt 78 (Fig. 9). The head 79 of the bolt is shaped to extend into any one of the recesses 27 of the upper cup so as to cause the latter to turn relatively to the lower cup when the bolt is turned in the nut 74. After the nut and bolt have been assembled, an operating nut or handle 80 may be fixedly secured to the bolt in any suitable way.

Owing to the fact that one or both pipes are connected to the coupling by ball or roller gripping means, it will be understood that one or both members of the coupling may be turned relatively to one another without turning the pipes, and this enables me to tighten or loosen the joint by threaded operating means used in connection with a two-part housing. Generally bayonet joints require a three-part housing.

It is manifest that the cups forming part of the coupler housing may be castings, forgings, or the like.

Many modifications of the invention will be apparent to those skilled in the art, as such modifications can be made without departing from the spirit of the invention or from the scope of the claims, and since the foregoing disclosure has been given by way of certain examples for clearness and understanding, no unnecessary limitation should be understood, and the claims should be construed as broad as the state of the art permits.

What I claim and desire to secure by Letters Patent is:

1. In a structure of the type having a housing with internal tapered seat means, a cage, movable gripping elements carried by the cage and movable with the cage along said tapered seat means, and means associated with the cage to frictionally engage a rod-like member inserted into the cage, the improvement in which the housing comprises a plurality of members, one of which is annular and turnable relatively to the other about the axis of the housing, bayonet joint means connecting said members together, and threaded operating means connected to one of said members and operatively engaging the turnable member for turning the latter in opposite directions.

2. In a pipe coupling, a tubular housing formed of a plurality of complementary annular members movable toward one another and connected together by a bayonet joint, each of said members being provided with an internal tapered seat arranged adjacent to an end of the housing, an apertured cage arranged in each member and movable axially of the housing, movable gripping elements extending through the apertures of the cages, engaging the tapered seats and adapted to grip pipes inserted in the housing, annular sealing means arranged in the housing at the inner ends of said cages, and threaded operating means supported by one of the housing members and operatively engaging the turntable housing member for turning the latter in opposite directions and for causing distortion of the sealing means when the turnable member is turned in one direction.

3. In a pipe coupling, a tubular housing formed of a plurality of complementary annular members movable toward one another and connected together by a bayonet joint, each of said members being provided with an internal tapered seat arranged adjacent to an end of the housing, an apertured cage arranged in each member and movable axially of the housing, movable gripping elements extending through the apertures of the cages, engaging the tapered seats and adapted to grip pipes inserted in the housing, annular sealing means arranged in the housing at the inner ends of said cages, and threaded operating means supported by one of the housing members and operatively engaging the turnable housing member for turning the latter in opposite directions and for causing distortion of the sealing means when the turnable member is turned in one direction, said sealing means comprising a pair of gaskets, each of which is of channel shape in radial section, said rings having inner lips spaced from one another and outer lips contacting one another and clamped between portions of the housing members.

STEPHEN V. DILLON.